Oct. 16, 1923.

C. E. JOHNSON 1,471,033

MOLDING MACHINE

Filed Jan. 24, 1922

Inventor
Charles E. Johnson
By Frank E. Liverance, Jr.
Attorney

Oct. 16, 1923.

C. E. JOHNSON

MOLDING MACHINE

Filed Jan. 24, 1922

Inventor
Charles E. Johnson
By Frank E. Liverance, Jr.
Attorney

Oct. 16, 1923.

C. E. JOHNSON

MOLDING MACHINE

Filed Jan. 24, 1922

Inventor
Charles E. Johnson
By Frank E. Liverance, Jr.
Attorney.

Oct. 16, 1923.

C. E. JOHNSON

MOLDING MACHINE

Filed Jan. 24, 1922

Inventor
Charles E. Johnson
By Frank E. Liverance, Jr
Attorney

Oct. 16, 1923.

C. E. JOHNSON

MOLDING MACHINE

Filed Jan. 24, 1922

Inventor
Charles E. Johnson
By Frank E. Liverance, Jr.
Attorney.

Patented Oct. 16, 1923.

1,471,033

UNITED STATES PATENT OFFICE.

CHARLES E. JOHNSON, OF MUSKEGON, MICHIGAN.

MOLDING MACHINE.

Application filed January 24, 1922. Serial No. 531,449.

*To all whom it may concern:*

Be it known that I, CHARLES E. JOHNSON, a citizen of the United States of America, residing at Muskegon, in the county of Muskegon and State of Michigan, have invented certain new and useful Improvements in Molding Machines; and I do hereby declare the following to be a full, clear, and exact description of the invention, such as will enable others skilled in the art to which it appertains to make and use the same.

This invention relates to a molding machine, having especial reference to a machine for making moulds for piston ring castings, though not limited to the one specific use. In the making of moulds for piston ring castings, the same must be made rapidly and with extreme accuracy for the production of a large quantity of castings with a minimum of expenditure for machinery, floor space, and the like to thereby reduce overhead expense, and the machine which I have invented has for its primary object and purpose an increase in the quantity of perfect and accurate moulds that may be made in a given time. A further object of the invention is to produce a machine with which practically all moulds made shall have the same qualities with respect to evenness of sand compression, cleanliness of the moulds and the like, every mould made being a substantial exact duplicate of the others without differences in quality, whereby few, if any, rejections of castings have to be made from improper moulds made. A still further object is to make a molding machine in which the heavy work of compressing the sand is done by the force of compressed air, saving the operator of the machine, and making the compression of the sand in the moulds uniform in all respects in the different moulds made. A yet further object of the invention is to provide a novel manner and construction of machine for carrying it out for drawing the mould away from the pattern, or dropping the pattern downwardly from the mould which not only shortens the time required but insures that the mould shall not be injured from too abrupt separation of the pattern therefrom, moving with comparative slowness at that particular instant, with a more rapid movement immediately after which lessens the time required all taking place with the exhaust of air from the machine and as one continuous operation. Many other objects and purposes than those stated, including adjustments of the machine for best operation and the like will appear as understanding of the invention is had from the following description, taken in connection with the accompanying drawings, in which.

Like reference characters refer to like parts in the different figures of the drawings.

Figure 4:
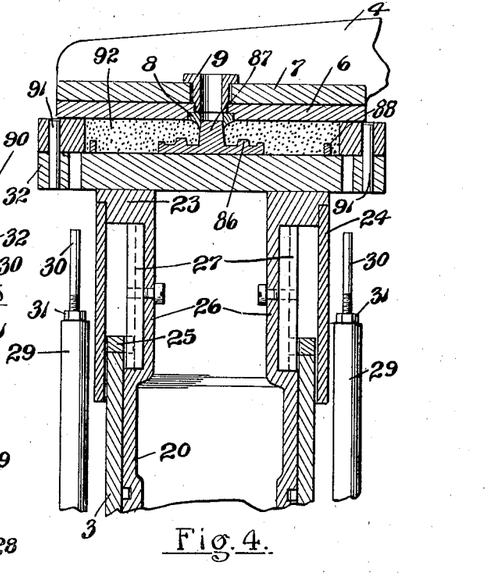
Fig. 4 is a like section showing the position of the parts during the compression of the sand in the mould.

In the construction of the machine, a heavy casting 1 is used, from which at its rear portion, vertical housing portions 2 project, being located back of an air cylinder 3 which is mounted vertically at the front of the base casting 1 as shown. A heavy and strong beam 4 is pivotally mounted between its ends on a shaft 5 between the parts 2, in front of the shaft carrying relatively wide plates 6 and 7 which lie one under the other and which are designed to come over the sand in the molding flask in the operation of the machine as will be later described. The lower plate 6 has a central opening therethrough in which a bushing 8 is fitted of the shape shown in Fig. 4, a second bushing 9 passing through the upper plate 7 and threading into the lower plate 6. The two bushings have central alined openings and the lower bushing 8 projects a short distance below the lower side of plate 6 and has downwardly and inwardly curved under sides as shown in Fig. 4.

Figure 1:
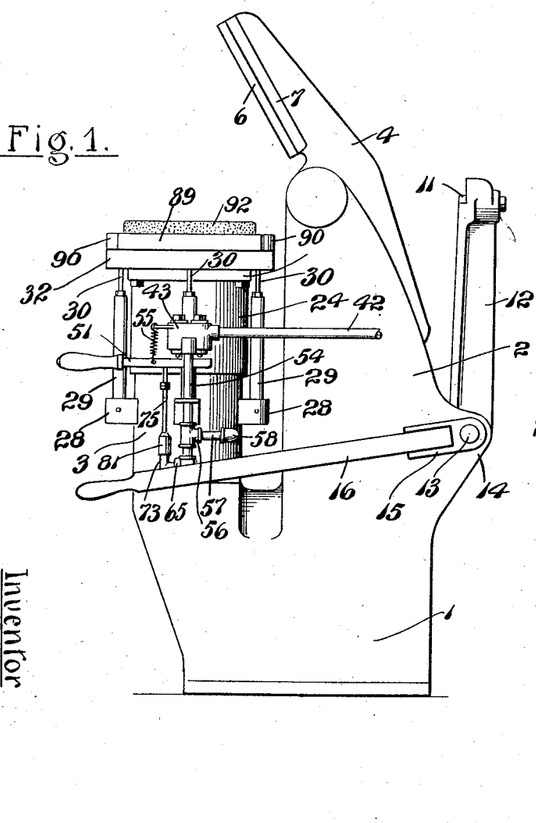
Fig. 1 is a side elevation of the molding machine, in the position it occupies while the sand is being placed in the flask.
Figure 2:
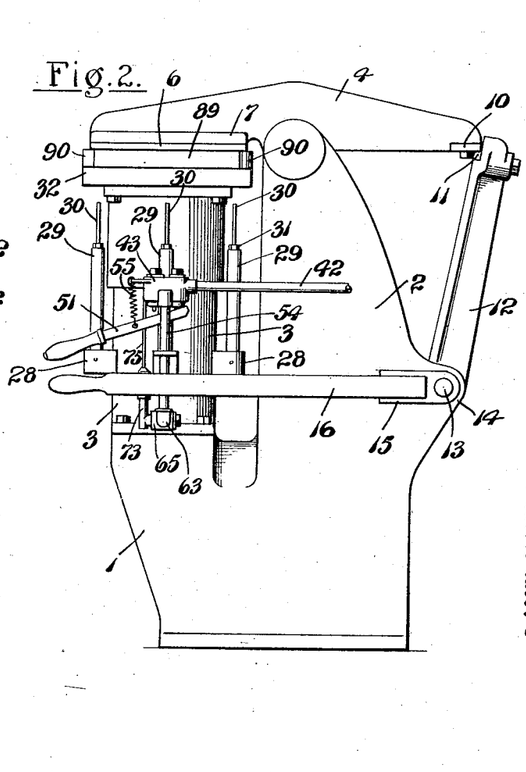
Fig. 2 is a like view, showing the machine in another position, or when the sand is being compressed.
Figure 19:
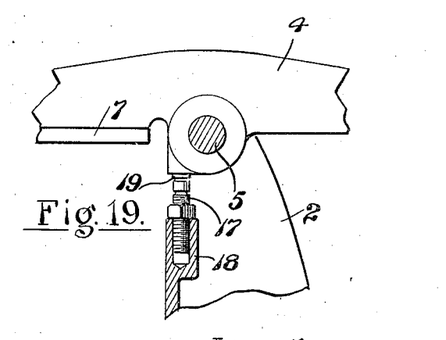
Fig. 19 is a fragmentary vertical section through the pivotal mount for the movable abutment against which the sand is forced in compressing it.

At their rear ends beams 4 are provided with a cross bar 10 adapted to engage with a stop 11 at the upper end of a bar 12 which is pivotally mounted between ears 14 extending rearwardly from the base casting 1, a rod 13 passing through the ears to which the bar 12 is connected. A block 15 is connected to rod 13 at one end, and a handle lever 16 connected to the block by means of which the rod and attached bar 12 may be turned to different positions. In one position the beams 4 are as shown in Fig. 1, the abutment plates 6 and 7 being elevated and the opposite rear ends of the beams 4 depressed. This abutment member is substantially balanced on the shaft 5 and may be easily turned by hand from the position shown in Fig. 1 to horizontal position as shown in Fig. 2, and as it is turned, the bar 10 rides against the front side of bar 12 and automatically is engaged with stop 11, to thereby hold the abutment member in horizontal position against any upward pressure against the under side of plate 6. In order that the front end of the abutment member shall not drop too low, an adjusting screw 17 is mounted in a socket 18 on the casting at 2 (see Fig. 19) against which a stop 19 on the abutment member comes when it has reached proper horizontal position.

To take up any wear which may occur at the latch at 10 and 11, any well known form of adjustment may be made use of, and I have used one means which, as it is not of particular consequence to the present invention is not specifically set forth. To unlatch and allow the abutment member to swing back to the position shown in Fig. 1, handle 16 is grasped and elevated, thereby freeing the abutment member as is evident.

Within the cylinder 3 a piston 20 having a closed lower end is mounted for vertical movements, at its upper portion being reduced in size to make a smaller upper section 21, there being a horizontal shoulder 22 at the juncture of the parts of the piston entirely around it on its outer side. The upper end of the reduced section 21 of the piston is enlarged, making an annular head 23 which at its outer edges extends past the sides of cylinder 3 and from which a covering sleeve 24 depends, the same passing outside of the cylinder. The upper section of the piston in opposite sides thereof is provided with guide recesses 26 for the reception of bars 27, which pass upwardly at their outer edges through notches made in a ring 25 attached at the upper end of cylinder 3 and projecting a short distance inwardly into such cylinder. This construction holds the piston from rotating and also prevents upward movement of the piston beyond the point where shoulder 22 engages against the ring 25.

At four substantially equally spaced points around the cylinder 3, outwardly projecting lugs 28 are cast from each of which a relatively heavy rod 29 extends upwardly, a smaller rod 30 extending downwardly into the upper end of each rod, threading thereinto and being equipped with a nut 31 to hold the same in adjusted position. A table 32 is secured to the upper end of the piston, bearing on the enlarged head 23, this table having openings through which the small rods 30 pass freely.

Figure 6:
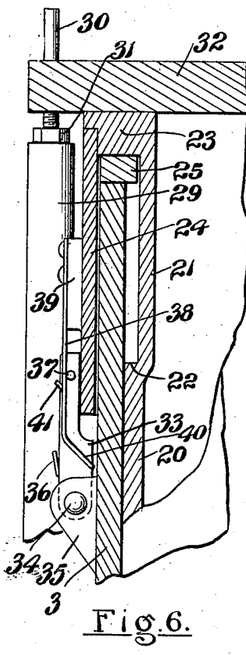
Fig. 6 is a fragmentary vertical section at one side of the air cylinder illustrating the position of the automatic latch mechanism used, the position shown being that when the piston is in lowermost position.
Figures 7, 8:
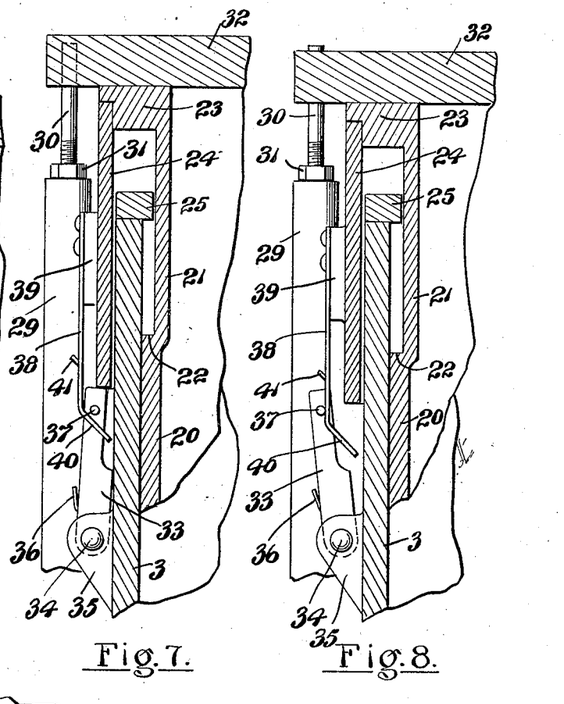
Figs. 7 and 8 are like sections showing the mechanism in two different positions of the piston.
Figure 9:
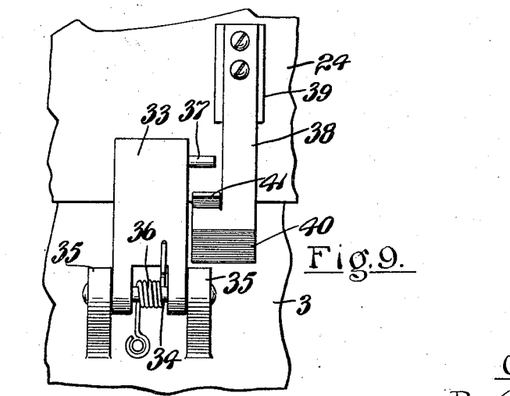
Fig. 9 is a fragmentary side elevation of the latch.
Figure 10:
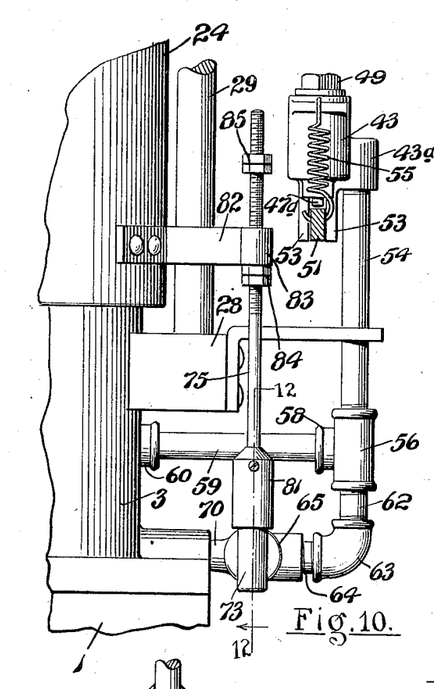
Fig. 10 is a front elevation of the air control mechanism of the machine.
Figures 11, 13:
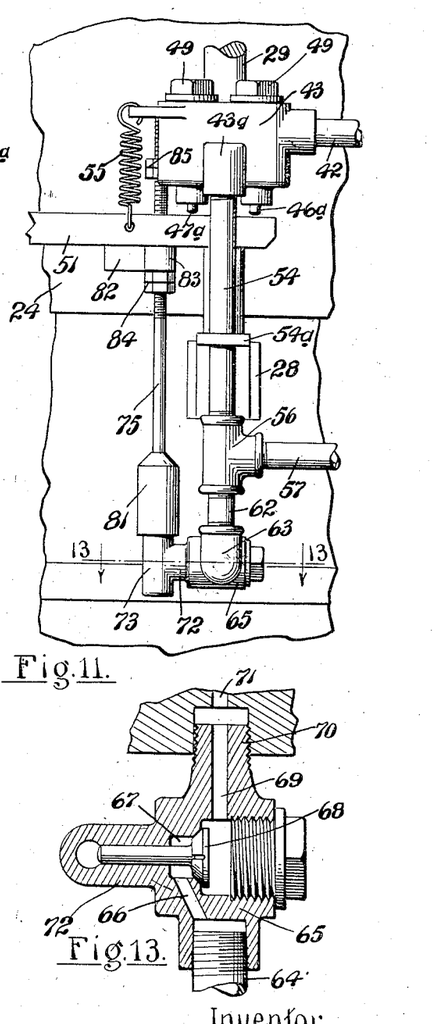
Fig. 11 is a side elevation thereof.
Figs. 12 and 13 are vertical and horizontal sections taken on the planes of lines 12—12 of Fig. 10, and 13—13 of Fig. 11, respectively.

At one side of the cylinder 3, a latch block 33 is pivotally mounted on a rod 34 disposed between two ears 35 cast integral with the cylinder. A spring 36 around the rod 34 having its ends bearing against a side of the cylinder and the outer side of the latch block normally tends to force the upper free end of the block inwardly. In the lowermost position of the piston, shown in Fig. 6, this block bears against the outer side of the depending sleeve 24. As the piston and attached sleeve is elevated, when the lower end of the sleeve passes by the upper end of the block it immediately moves inwardly under the end of the sleeve as shown in Fig. 7.

A pin 37 projects laterally from the latch block 37. A spring bar 38 is attached to and depends from the sleeve 24, being spaced outward a short distance therefrom by block 39 and at its lower end is widened and turned inwardly at an angle as indicated at 40. A portion of this widened portion at its upper part and adjacent pin 37 is cut and bent outwardly as indicated at 41. When the piston is elevated above the position shown in Fig. 7 the spring bar at its lower inwardly pressed end rides over pin 37 to a point above it, whereby on its downward movement with the piston, the inturned end 40 enters between the pin and the outer side of the cylinder, moving the latch bar 33 out to the position shown in Fig. 8, the pin 37 passing along the widened lower portion at the lower end of spring bar 38 until it passes over the upper end of outturned lip 41, coming back to its original position, as shown in Fig. 6.

Figure 18:
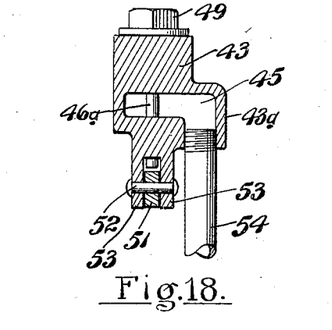
Fig. 18 is a vertical section taken on the plane of line 18—18, of Fig. 17.

The piston is designed to be forced upwardly by compressed air entered into the cylinder below the piston. It is necessary to control the operation and flow of the air and the same is done by means of the following construction:

The compressed air is conducted from any suitable source of supply therefor through a pipe 42 to a valve casing 43 positioned alongside the cylinder 3 and in which are two compartments 44 and 45 separated by a partition having a communicating opening therethrough closed normally by a valve 46. The compartment 45 has an outlet opening, normally closed by a valve 47, the casing 43 being provided with an exhaust opening 48 through which the air may escape when the valve 47 is lifted. Plugs 49 thread into the upper side of the valve casing over valves 46 and 47, pins 50 extending downwardly from the plugs so as to limit the upward movement of the valves. A hand operated lever 51 is pivotally mounted on a pivot pin 52 carried by and between ears 53 extending downwardly from the valve casing 43. The valves 46 and 47 have pins 46ª and 47ª extending downwardly therefrom through the lower side of the valve casing so as to come directly over the upper edge of lever 51, one at each side of the pivot 52. The valve casing at one side is formed with an enlargement 43ª (see Fig. 18) into which the upper end of a vertical pipe 54 is secured. The lever 51 is normally held in a neutral horizontal position by a spring 55 which substantially balances the weight of the lever. It is evident that on depressing the front end of lever 55, valve 46 is raised, allowing the compressed air from compartment 44 to flow into compartment 45 and therefrom outward through the outlet pipe 54 to the cylinder 3, through construction which will hereafter appear, and that on opposite movement of the lever 51, valve 47 is lifted and the air exhausted from the cylinder through outlet passage 48.

Figure 3:
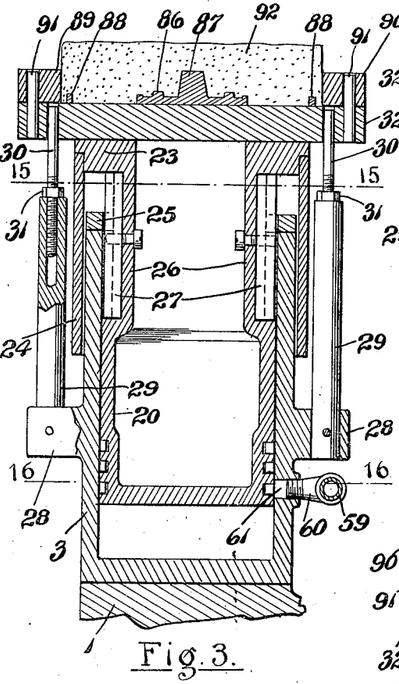
Fig. 3 is a central vertical section through the air cylinder of the machine and the parts associated therewith.

The pipe 54 extends downwardly to and joins with a T 56 with which a lateral branch 57 connects, an elbow 58, pipe 59 and reducer 60 connecting the branch 57 with the cylinder 3 at a port 61 which is covered by the piston 3 in the lowermost position of the piston (see Fig. 3). A nipple 62 extends from the lower end of T 56, joining an elbow 63 which in turn is connected by a nipple 64 with a second valve casing 65 formed with a passage 66 leading from the point of connection of nipple 64 to an interior recess 67, at the open end of which a valve 68 is positioned between the recess and an outlet passage 69 made through an exteriorly threaded neck 70 projecting from the valve casing 65 and threading into the cylinder 3 at its lower end below the lowermost position to which the piston therein can come, and at a point directly in alinement with an inlet port 71 made in the cylinder. The valve 68, it will be noted, has grooves cut in its face so as to permit the passage of a limited amount of air even when the valve is closed, it being evident that on the first passage of air through pipe 54, the air comes to the valve through passage 66, thereby forcing the valve from its seat and allowing the passage of the full amount that the passages 66 and 69 can carry until such time as the port 61 is opened by the rise of the piston whereupon the air passes into the cylinder through both ports 61 and 71.

Figure 12:
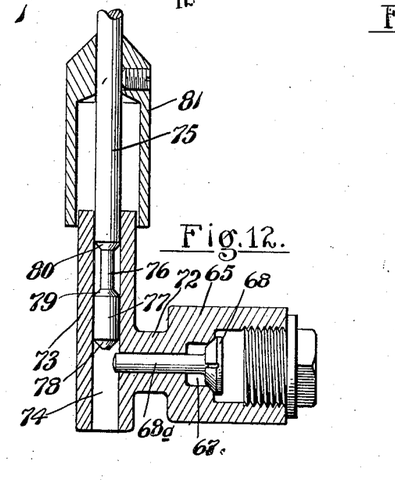

The valve casing 65 at one side is formed with a laterally extending neck 72 at the end of which a sleeve 73 is formed, positioned vertically and having a vertical passage 74 therethrough. The valve 68 has a valve pin 68ª extending through the neck 72 and projecting a short distance at its end into the passage 74, as shown in Fig. 12. A rod 75 having a diameter slightly less than the diameter of the passage 74 is positioned at its lower portion in the passage, being formed with a reduced section 76 a short distance above its lower end, the lower end portion 77 being of the same diameter as the main body of the rod. The lower and upper ends of the portion 77 are cut with inclined cam surfaces 78 and 79 while the lower end of rod 75 where it joins section 76 is likewise formed with an inclined cam surface 80, as shown in Fig. 12. A shroud 81 is connected to the rod 75 above the sleeve 73 and at its lower end passes over the upper end of the sleeve to prevent the entrance of sand or other foreign matter into the sleeve.

The upper portion of the rod 75 passes loosely through a sleeve 83 formed at the end of a bracket 82 attached to and extending outwardly from the sleeve 24 passing over cylinder 3. The upper end of the rod is threaded to receive nuts 84 below sleeve 83 and nuts 85 above such sleeve, it being obvious that with the upward and downward movements of the piston and attached sleeve 24, the rod will be correspondingly moved upward or downward when said bracket 82 is moved to proper position that its end 83 engages with the nuts 84 or 85.

Figure 14:
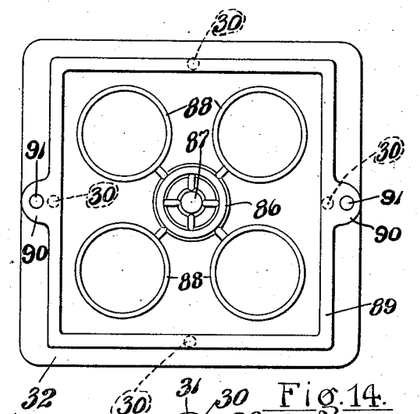
Fig. 14 is a plan view of the upper end of the air operated piston, showing the pattern and flask thereon.
Figure 15:
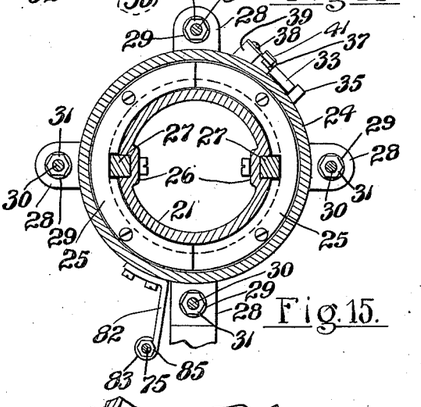
Figs. 15 and 16 are horizontal sections taken on the planes of lines 15—15 and 16—16, of Fig. 3.
Figure 16:
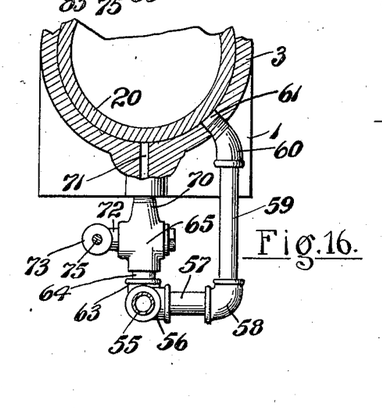
Figure 17:
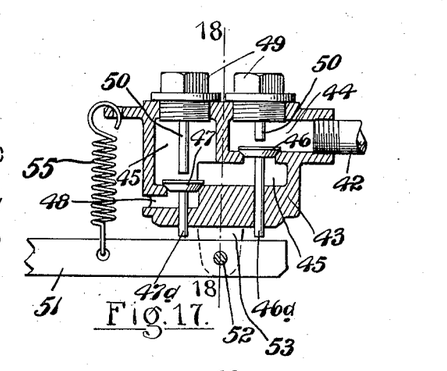
Fig. 17 is a fragmentary vertical section through the air control valve mechanism of the machine.

The pattern is attached at the upper side of the table 32, consisting of a ring 86 around a sprue print 87 and a plurality of ring patterns 88 connected to the ring 86 by proper gates, said ring 86 connecting with the sprue print by gates as best shown in Fig. 14. Any desired type of pattern may be used, the particular construction shown herein being no part of the present invention.

In the operation of the machine, the piston is first raised to the filling position, indicated in Fig. 7, with the latch block 33 under the lower edge of sleeve 24. A flask frame 89 is placed on the table 32 around the pattern, and is properly positioned thereon, ears 90 on the frame passing over locating pins 91 projecting upward from the table at opposite sides thereof. The frame is then filled with molding sand, indicated at 92 and a greater amount is used than just to fill the frame, the sand extending above the upper edges of the frame, as shown in Fig. 3, an auxiliary filling frame (not shown) being usually used to gauge the additional amount of sand to be used. The abutment member is then brought to the position shown in Fig. 2, abutment plates 6 and 7 lying directly over the flash frame and sand and being held in such position by the latch bar 12. The lever 51 is then depressed, as shown in Fig. 2, valve 46 being lifted and the compressed air carried through pipe 54 and the connected conduits at the lower end thereof into the cylinder through port 71 first and through both ports 71 and 61 after port 61 is uncovered, thereby elevating the piston to the position shown in Fig. 4, the sand being firmly compressed into the flask frame. It is obvious that as this occurs, the upwardly extending sprue print 87 enters the bushing 8 so that the mould formed has a sprue opening therethrough made completely and simultaneously with the compressing operation and nothing further has to be done with respect thereto. This is a feature of the present invention of considerable value as the time usually required for fashioning the sprue is obviated. The rounder curved under surface of the bushing 8 gives the spru a curved and slightly enlarged upper end as is desirable and commonly used.

Figure 5:
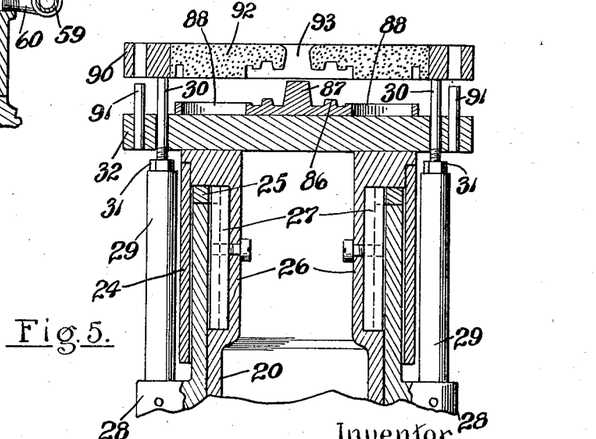
Fig. 5 is a like section showing the air operated piston dropped to lower position in the operation of drawing the pattern from the mould during the exhaust stroke of the piston.

As soon as the sand has been compressed, the position of lever 51 is reversed, being lifted to lift valve 47 and permit the air to escape through exhaust passage 48. In the beginning the air passes freely out of both the ports 61 and 71, the head 77 of rod 75 bearing against stem 68ª and opening valve 68. During this initial rapid exhaust of the air in the cylinder and consequent rapid downward movement of the piston and attached parts, the upper ends of pins or rods 30 are approaching the under sides of the flask frame 89 and before they contact therewith, it is necessary to check the speed of downward movement of the piston, otherwise the lifting of the frame from the pattern will be too abrupt and violent, making it likely that the mould will be disrupted so as to be imperfect. Before this contact occurs, the port 61 is covered by the descending piston 20, the reduced section 76 of rod 75 comes opposite the end of the valve rod 68ª, the valve 68 automatically closing by reason of the exhaust air pressure, whereby the escape of air is limited to what leaks around and by the valve, as previously noted. This lets the piston down more slowly during the time that the mould and pattern are separating thus making it possible to draw the pattern from the mould on the downstroke of the piston, with one substantially continuous movement, on the exhaust stroke of the piston, such exhaust being controlled automatically as described. This is a feature of novelty and value, aiding greatly in the speed of operation of the machine. It is to be understood that the mould frame and pattern have been subjected to the usual vibrator action used with moulds of this character prior to the engagement of the rods 30 with the flask frame, the vibrator not being shown herein as it is old and well known and not novel with this invention. The piston and pattern drop slowly until the pattern and mould are fully separated, the flask frame and mould therein being supported at the upper ends of rods 30, as shown in Fig. 5. The frame and mould may then be removed from the machine and placed with others for pouring, the piston during its later downward movement moving more rapidly when the end of the valve stem 68ª is engaged by the lower end of the rod 75 above section 76 to open valve 68 for more free escape of the air, thereby insuring the unlatching of latch block 33 and its automatic relatching on the next upward movement of the piston. The lever 51 is then depressed momentarily to pass air into the cylinder to lift it to the position shown in Fig. 3 and Fig. 7 to elevate the table 32 so that its upper surface comes above the upper ends of rods 30 upon which another flask frame 89 may be placed on the table and the operation repeated. During the time that the sand is being placed in the flask, no downward movement of the piston and table can occur as it is positively locked thereagainst by the latch block 33.

This construction of molding machine in practice has proved particularly effective in every way. Not only is the work done more rapidly, but it is done with much less effort, the only physical effort on the part of the operator being to place the sand in the flask, operate the air control lever and the abutment release lever, and turn the abutment member back, none of which are heavy or fatiguing. The pressure on the sand for each mould is uniform, there being no variations so long as the effective air pressure remains constant. There is no forming of sprue openings by hand. There is little or no likelihood of imperfect moulds being formed, of parts dropping from the mould, or anything of a character to make a mould defective. And from all of these features, the production is greatly increased and the castings made in the moulds are practically all good, with little or no rejections. The machine has been in constant service for a considerable time and has proved its exceptional merit.

The invention is defined in the appended claims and I consider myself entitled to all forms of structure coming within the scope thereof.

I claim:

1. A molding machine comprising a support, a cylinder mounted thereon, a piston in the cylinder extending above the upper end thereof, means for carrying compressed air into the cylinder below the piston and away from the cylinder, automatic means for controlling the escape of air from the cylinder so as to have a relatively rapid exhaust at the beginning and a slower exhaust at the end of the exhaust operation, a pattern carrying table carried at the upper end of the piston, an abutment member movably mounted above the table, and means for automatically stopping downward movement of a flask placed on the table and permitting the table to move downwardly away therefrom substantially at the time the checking of the exhaust of air from the cylinder occurs.

2. A molding machine comprising a support, a cylinder mounted vertically on the support, a piston mounted in the cylinder and extending above the same, a pattern carrying table at the upper end of the piston, means for conducting compressed air into the cylinder below the piston and from the cylinder to the outside, manually operated means for controlling the entrance and exhaust of the air, an abutment member pivotally mounted on the support above and back of the table adapted to be moved to a horizontal position so that its front end lies directly over the table, a pivotally mounted latch bar on the support automatically engaging with the rear end of the abutment member to hold said member locked in horizontal position, and manually operable means for moving the latch bar to release said abutment member, substantially as described.

3. A molding machine comprising a support, a cylinder mounted vertically on the support, a piston therein extending above the upper end of the cylinder, a pattern carrying table at the upper end of the piston, means for carrying compressed air into the cylinder below the piston and away from the cylinder to the outside, manually operable valve means to control the entrance or exhaust of the air, an abutment member pivotally mounted between its ends to an upwardly extending portion of the support back of the cylinder, a latch bar pivotally mounted at its lower end to the support and extending upwardly in position to engage with the rear end of the abutment member when the same is turned to horizontal position, and a forwardly extending handle member connected with the latch bar for turning the same rearwardly to disengage the same from the abutment member.

4. A molding machine, comprising a support, a vertically positioned cylinder carried by the support, a piston in the cylinder and extending above the same, said piston at its upper end projecting outward beyond the walls of the cylinder, a sleeve depending from the upper end of the piston around the upper end of the cylinder, a latch block pivotally mounted on the outside of the cylinder, means for normally forcing the latch block inwardly under the lower end of the sleeve when the sleeve is elevated, means for automatically moving the latch block outward on upward movement of the piston and attached sleeve followed by a downward movement thereof, and means for controlling the movements of the piston through compressed air entered into and exhausted from the cylinder.

5. A molding machine comprising a support, a vertically positioned cylinder on the support, a piston in the cylinder extending above the upper end thereof, said piston at its upper end being enlarged and projecting outwardly beyond the walls of the cylinder, a sleeve depending from the upper end of the piston over the cylinder, a latch block pivotally mounted at its lower end on the cylinder, spring means normally tending to move the block inwardly at its upper end to pass under the lower edge of the sleeve on elevation thereof, a pin extending laterally from the block, means carried by the sleeve to engage with the pin to swing the block outwardly on upward movement of the sleeve followed by a downward movement thereof, means for carrying compressed air into the cylinder below the piston and from the piston to the outside, and manually operable means for controlling the entrance and exhaust of the air, substantially as described.

6. A molding machine including a vertically positioned cylinder closed at its lower end, a piston therein extending above the upper end of the cylinder, a sleeve attached to the piston at its upper end and passing downwardly around the cylinder, a latch block pivotally connected at its lower end to the cylinder, spring means normally forcing the upper end of the block inwardly to pass under the lower end of the sleeve on elevation thereof, a pin extending laterally from the block, a spring bar attached to and depending from the sleeve and spaced outwardly a short distance from the sleeve, at its lower end being widened and turned inwardly at an angle, said inwardly turned widened portion being adapted to engage with the pin on downward movement of the sleeve after sufficient elevation to carry the bar above the pin and move the block outwardly, and means for controlling the movements of the piston and attached sleeve through entrance and exhaust of compressed air into and out of the cylinder below the piston, substantially as described.

7. In a molding machine, a vertically positioned cylinder, a piston mounted therein and extending above the upper end thereof, a pattern carrying table at the upper end of the piston, an abutment member movable into or away from a position directly over the table, a conduit for carrying compressed air into the cylinder below the piston, a valve casing in the conduit having an exhaust opening, two valves in the valve casing lifting of one of which will carry the air into the cylinder and lifting of the other of which will carry the air from the cylinder out through said exhaust passage, and a manually operable lever for lifting the valves, one at a time, said lever being inoperative to lift the valves simultaneously.

8. In a molding machine, a vertically positioned cylinder, a piston mounted therein and extending above the upper end thereof, a pattern carrying table at the upper end of the piston, an abutment member movable into or away from a position over the table, a valve casing having a partition therein dividing the same into two compartments, one of which has an exhaust outlet, a pipe leading into the other compartment adapted to carry compressed air thereto, a valve mounted to close an opening in the partition and having a depending stem extending below the valve casing, a second valve mounted to close the exhaust passage and likewise having a depending stem extending below the valve casing, a pipe leading from the first compartment to the lower end of the cylinder, and a lever pivotally mounted on the valve casing at a point between the lower ends of the two valve stems, the upper edge of the lever lying normally immediately below the lower ends of said stems.

9. In a molding machine, a vertically positioned cylinder, a piston mounted therein and extending above the upper end thereof, a pattern carrying table at the upper end of the piston, an abutment member movable into or away from a position directly over the table, a conduit for carrying compressed air into the cylinder and below the piston, a valve casing in the conduit having an exhaust opening, two valves in the casing one to control the passage of air to the cylinder and the other for opening and closing the exhaust opening, means for operating the valves, a second valve casing in the conduit between the first valve casing and the cylinder, a valve therein adapted to be opened by pressure of air when the air is going to the cylinder and closed by air pressure when the air is exhausting from the cylinder, said valve inclosed position having passages permitting the exhaust of a limited amount of air, and means attached to and movable with the piston for opening said last mentioned valve at predetermined positions of the piston on its downward movement, substantially as described.

10. In a molding machine, a vertically positioned cylinder, a piston therein extending above the cylinder and having an enlarged upper end, a sleeve depending from the piston over the cylinder, a valve casing having two compartments and two valves therein, one of said compartments having an exhaust outlet in which one of the valves is located, a pipe carrying compressed air leading into the other compartment, a pipe leading away from the first compartment, means for moving either valve, a branch pipe connected with the second pipe and leading into the cylinder a short distance above its lower end, connections between said second pipe and the cylinder forming a conduit leading into the cylinder at its lower end, one of said connections in the conduit comprising a valve casing having a passage therethrough, a valve in said casing adapted to be opened by air pressure when the air is going into the cylinder and closed by air pressure when the air is exhausting from the cylinder, said valve in closed position having passages permitting the exhaust of a limited amount of air, and means connected with and operable by the sleeve on downward movement thereof for opening said last named valve at predetermined positions of the sleeve and connected piston on their downward movement.

11. In a molding machine, a vertical cylinder, a piston mounted therein and extending above the cylinder, a table on the upper end of the piston, a conduit for carrying air into and away from the cylinder below the lower end of the piston, pins connected to the cylinder at the outer sides thereof and adapted to pass upwardly through the table, an abutment adapted to be positioned over the table, a pattern on the table around which a flask frame is adapted to be positioned and filled with sand, means for controlling the entrance of air into the cylinder to force the piston upwardly to compress the sand into the mould, means for manually letting the air out of the cylinder to permit the piston to drop relatively rapidly, and means in the conduit for stopping the relative rapid drop of the piston substantially at the time the pins engage against the flask frame to hold the same stationary while the piston, table and pattern thereof continue to drop at lessened speed, the pattern drawing from the mould made in the sand, substantially as described.

12. In a molding machine, a vertical cylinder, a piston mounted therein and extending above the cylinder, a table on the upper end of the piston, a sleeve depending from the upper end of the piston over the cylinder, rods attached to the cylinder and extending upwardly toward the table, being adapted to pass through the table, an abutment member adapted to be positioned over the table, a pattern on the table around which a flask frame is to be placed and filled with sand, a conduit for carrying compressed air into the cylinder below the piston or away from the cylinder, said conduit having two branches leading into the cylinder at different vertical points, means for controlling the entrance of compressed air into the conduit, a valve casing in the lower branch of the conduit having a passage therethrough, a valve located in the passage adapted to be opened by air pressure when the air is going into the cylinder, but closed by air pressure when the air is passing outward from the cylinder, means to exhaust air from the cylinder, a valve stem extending from the valve, a sleeve on the valve casing into which the end of the stem extends, a rod positioned vertically and extending into the sleeve at its upper end, said rod a short distance above its upper end being provided with a short section of reduced diameter, said rod acting on the stem to open the valve by bearing against the valve stem at its portions of larger diameter, and said valve being provided with passages allowing the escape of a limited supply of air when the valve is in closed position, a bracket extending from the sleeve provided with a guide at its end through which said last mentioned rod passes, and nuts threaded on to the rod above and below said guide, substantially as and for the purposes described.

13. In a molding machine, a cylinder, a piston therein extending above the upper end of the cylinder, a table at the upper end of the piston, a pattern on the table around which a flask frame is to be placed and filled with sand, an abutment against which the sand is forced by the upward movement of the piston to compress it into the frame, means mounted on the cylinder and adapted to pass through the table to engage with said flask frame on downward movement of the piston, means to enter and exhaust compressed air into and from the cylinder below the piston, and means for checking the exhaust of the air from the cylinder substantially at the time that the flask frame is engaged by its engaging means and held while the piston, table and pattern are lowering to draw the pattern from the mould, said means becoming ineffective after the pattern is fully drawn whereby the piston and attached parts may drop more rapidly with greater exhaust of the air from the cylinder.

In testimony whereof I affix my signature.

CHARLES E. JOHNSON.